United States Patent
McLean et al.

(10) Patent No.: US 9,743,156 B1
(45) Date of Patent: Aug. 22, 2017

(54) SYSTEMS AND METHODS FOR STITCHING ADVERTISEMENTS IN STREAMING CONTENT

(71) Applicant: SnifferCat, Inc., Los Angeles, CA (US)

(72) Inventors: Stuart L. McLean, Los Angeles, CA (US); Thomas Hamilton Link, Pasadena, CA (US)

(73) Assignee: SnifferCat, Inc., Los Angeles, CA (US)

( * ) Notice: Subject to any disclaimer, the term of this patent is extended or adjusted under 35 U.S.C. 154(b) by 0 days.

(21) Appl. No.: 15/232,561

(22) Filed: Aug. 9, 2016

Related U.S. Application Data

(63) Continuation of application No. 15/199,789, filed on Jun. 30, 2016.

(51) Int. Cl.
| | |
|---|---|
| *G06F 15/16* | (2006.01) |
| *H04N 21/81* | (2011.01) |
| *H04N 21/2668* | (2011.01) |
| *H04N 21/472* | (2011.01) |
| *H04L 29/08* | (2006.01) |
| *H04L 29/06* | (2006.01) |

(Continued)

(52) U.S. Cl.
CPC ....... *H04N 21/812* (2013.01); *G06Q 30/0277* (2013.01); *H04L 65/4084* (2013.01); *H04L 65/601* (2013.01); *H04L 67/306* (2013.01); *H04N 21/23424* (2013.01); *H04N 21/2668* (2013.01); *H04N 21/47217* (2013.01)

(58) Field of Classification Search
CPC ............. H04N 21/812; H04N 21/2668; H04N 21/47217; H04L 67/306; H04L 65/601; H04L 65/4084; G06Q 30/0277
See application file for complete search history.

(56) References Cited

U.S. PATENT DOCUMENTS

| | | | | |
|---|---|---|---|---|
| 6,993,081 | B1 * | 1/2006 | Brunheroto | ...... H04N 21/23406 370/487 |
| 8,572,646 | B2 * | 10/2013 | Haberman | ........... G11B 27/031 705/14.49 |

(Continued)

OTHER PUBLICATIONS

International Application No. PCT/US2017/035235, International Search Report and Written Opinion dated Jun. 12, 2017.

*Primary Examiner* — Richard G Keehn
(74) *Attorney, Agent, or Firm* — Sheppard, Mullin, Richter & Hampton LLP

(57) ABSTRACT

Systems and methods for stitching advertisements in streaming content are disclosed. In some embodiments, a method comprises receiving one or more advertisements. An unmarked content item may be received, the unmarked content item comprising a stream-enabled video including a set of sequential black frames. An insertion point may be identified based on a location of at least one black frame of the set of sequential black frames without requiring user input, the insertion point identified during streaming of the unmarked content item to a consumer system, the insertion point being ahead of a current playback point of the unmarked content item streaming to the consumer system. The one or more advertisements may be stitched in the unmarked content item at the insertion point. The unmarked content item may be streamed to a consumer system until the insertion point is reached, and the one or more advertisements may be streamed to the consumer system when the insertion point is reached.

13 Claims, 11 Drawing Sheets

(51) Int. Cl.
*G06Q 30/02* (2012.01)
*H04N 21/234* (2011.01)

(56) References Cited

U.S. PATENT DOCUMENTS

| | | | |
|---|---|---|---|
| 8,752,085 B1* | 6/2014 | Brueck | H04L 65/601 |
| | | | 725/32 |
| 9,197,857 B2* | 11/2015 | VerSteeg | G06Q 30/02 |
| 2002/0083439 A1* | 6/2002 | Eldering | G06Q 30/02 |
| | | | 725/32 |
| 2002/0100043 A1 | 7/2002 | Lowthert et al. | |
| 2011/0119703 A1* | 5/2011 | Schlack | H04N 7/17318 |
| | | | 725/34 |
| 2015/0106841 A1* | 4/2015 | Wolf | H04N 21/812 |
| | | | 725/32 |
| 2016/0205443 A1* | 7/2016 | Ghadi | H04N 21/812 |
| | | | 725/34 |

\* cited by examiner

SYSTEMS AND METHODS FOR STITCHING ADVERTISEMENTS IN STREAMING CONTENT

CROSS REFERENCE

This application is a continuation of U.S. patent application Ser. No. 15/199,789, filed Jun. 30, 2016, entitled "Systems and Methods For Stitching Advertisements In Streaming Content," which is hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Technical Field

Embodiments of the present inventions relate generally to the field of streaming content. More specifically, embodiments of the present inventions relate to stitching advertisements in streaming content.

Description of Related Art

Over 400 original series were produced and distributed in 2015. Such a dramatic increase in content offerings has largely been due to an increase in on-demand content, e.g., streaming content. However, monetizing on-demand content has proven difficult. Typically, commercial advertisements are the primary source of monetization of streaming content.

On-demand service and solution companies (e.g., Brightcove, Freewheel, etc.) require manual insertion points to flag ad servers and insert commercials. For example, an operator may have to go through a video and manually flag various points in the video to insert commercials, which can be both time-consuming and expensive.

SUMMARY

The amount of original content (e.g., shows, movies, etc.) has increased dramatically over the past several years. On-demand service providers have given content providers (e.g., Young Hollywood) a platform for delivering their content on-demand without being restricted to conventional broadcast requirements (e.g., broadcast schedules, media format requirements, etc.). However, monetizing on-demand content has been problematic and expensive. For example, on-demand service providers typically require content providers to manually tag various points of a video to indicate locations for advertisements. For example, an operator may view a video and look for a sequence of black frames indicating a potential insertion point. Upon reaching a sequence of black frames, the operator can manually flag an insertion point. Such a process may be time consuming, expensive, and prone to error.

Some embodiments described herein include systems and methods for stitching advertisements in streaming content. For example, advertisements may be provided during playback of streaming content without requiring an operator to have previously tagged insertion points. In some embodiments, a server system scans streaming content for a set of sequential black frames. Upon locating a first black frame, a potential insertion point may be automatically registered (e.g., without requiring user input) by the server system, and the server system may scan for a next black frame. If the next frame is also a black frame, an insertion point may be automatically registered by the server system. Alternatively, if the next frame is a video content frame, as opposed to a black frame, the server system may clear the registered potential insertion point, and continue scanning for black frames. The server system may perform this process until an end of the streaming content is reached.

In some embodiments, one or more advertisements are provided in real-time for each of the registered insertion points. For example, a registered insertion point may trigger the server system to "pause" streaming of video content, and stream one or more advertisements instead of the video content. Streaming of video content may be resumed upon conclusion of the advertisements.

In various embodiments, a system comprises an advertisement provider interface engine configured to receive one or more advertisements. A content provider interface engine may be configured to receive an unmarked content item, the unmarked content item comprising a stream-enabled video including a set of sequential black frames. An insertion point detector engine may be configured to identify an insertion point based on a location of at least one black frame of the set of sequential black frames without requiring user input, the insertion point identified during streaming of the unmarked content item to a consumer system, the insertion point being ahead of a current playback point of the unmarked content item streaming to the consumer system. A content processing engine may be configured to stitch the one or more advertisements in the unmarked content item at the insertion point. A content delivery engine may be configured to stream the unmarked content item to a consumer system until the insertion point is reached, and stream the one or more advertisements to the consumer system when the insertion point is reached.

In some embodiments, the one or more advertisements comprise stream-enabled video.

In some embodiments, the insertion point detector engine is further configured to identify the insertion point in response to satisfaction of a predetermined threshold condition. In related embodiments, the predetermined threshold condition is satisfied if a diagonal portion of each frame of the set of sequential black frames comprises all black pixels.

In some embodiments, the content processing engine configured to stitch the one or more advertisements in the unmarked content item at the insertion point comprises the content processing engine configured to trigger the content delivery engine to stream one or more advertisements to the consumer system at the insertion point.

In some embodiments, the content processing engine configured to stitch the one or more advertisements in the unmarked content item at the insertion point comprises the content processing engine configured to modify the unmarked content item to add the one or more advertisements to the unmarked content item at the insertion point.

In some embodiments, the system further comprises a consumer profile manager configured to identify one or more consumer system attributes of the consumer system. In related embodiments, the advertisement provider interface engine is further configured to provide a request for the one or more advertisements based on the one or more consumer system attributes, the advertisement provider interface engine is configured to receive the one or more advertisements based on the one or more consumer system attributes.

In related embodiments, the one or more advertisements are selected during streaming of the unmarked content item to the consumer system. In related embodiments, the content processing engine is further configured to modify a format of the one or more advertisements based on the one or more consumer system attributes, the format of the one or more advertisements modified during streaming of the unmarked content item to the consumer system. In related embodiments, the content processing engine is further configured to modify a format of the unmarked content item based on the one or more consumer system, and the content delivery engine is further configured to stream the modified unmarked content item to the consumer system until the delivery time is reached.

In various embodiments, a method comprises receiving one or more advertisements. An unmarked content item may be received, the unmarked content item comprising a stream-enabled video including a set of sequential black frames. An insertion point may be identified based on a location of at least one black frame of the set of sequential black frames without requiring user input, the insertion point identified during streaming of the unmarked content item to a consumer system, the insertion point being ahead of a current playback point of the unmarked content item streaming to the consumer system. The one or more advertisements may be stitched in the unmarked content item at the insertion point. The unmarked content item may be streamed to a consumer system until the insertion point is reached, and the one or more advertisements may be streamed to the consumer system when the insertion point is reached.

In some embodiments, the one or more advertisements comprise stream-enabled video.

In some embodiments, the method further comprising identifying the first black frame in response to satisfaction of a predetermined threshold condition. In related embodiments, the predetermined threshold condition is satisfied if a diagonal portion of the first black frame of the set of sequential black frames comprises all black pixels.

In some embodiments, the stitching the one or more advertisements in the unmarked content item at the insertion point comprises streaming the one or more advertisements to the consumer system at the insertion point without modifying the unmarked content item.

In some embodiments, the content processing engine configured to stitch the one or more advertisements in the unmarked content item at the insertion point comprises the content processing engine modifying the unmarked content item to add the one or more advertisements to the unmarked content item at the insertion point.

In some embodiments, the method further comprises identifying, by the server system, one or more consumer system attributes of the consumer system. In related embodiments, the method further comprises providing, by the server system, the one or more advertisements based on the one or more consumer system attributes, the receiving the one or more advertisements comprising receiving the one or more advertisements based on the consumer system attributes. In related embodiments, the one or more advertisements are selected during streaming of the unmarked content item to the consumer system.

In some embodiments, the method further comprises modifying a format of the one or more advertisements based on the one or more consumer system attributes, the format of the one or more advertisements being modified during streaming of the unmarked content item to the consumer system.

In some embodiments, the method further comprises modifying a format of the unmarked content item based on the one or more consumer system, and streaming the modified unmarked content item to the consumer system until the delivery time is reached.

In various embodiments, a non-transitory computer readable medium comprises executable instructions, the instructions being executable by a processor to perform a method, the method comprising receiving one or more advertisements. An unmarked content item may be received, the unmarked content item comprising a stream-enabled video including a set of sequential black frames. An insertion point may be identified based on a location of at least one black frame of the set of sequential black frames without requiring user input, the insertion point identified during streaming of the unmarked content item to a consumer system, the insertion point being ahead of a current playback point of the unmarked content item streaming to the consumer system. The one or more advertisements may be stitched in the unmarked content item at the insertion point. The unmarked content item may be streamed to a consumer system until the insertion point is reached, and the one or more advertisements may be streamed to the consumer system when the insertion point is reached.

DETAILED DESCRIPTION

The amount of original content (e.g., shows, movies, etc.) has increased dramatically over the past several years. On-demand service providers have given content providers (e.g., Young Hollywood) a platform for delivering their content on-demand without being restricted to conventional broadcast requirements (e.g., broadcast schedules, media format requirements, etc.). However, monetizing on-demand content has been problematic and expensive. For example, on-demand service providers typically require content providers to manually tag various points of a video to indicate locations for advertisements. For example, an operator may view a video and look for a sequence of black frames indicating a potential insertion point. Upon reaching a sequence of black frames, the operator can manually flag an insertion point. Such a process may be time-consuming, expensive, and prone to error.

Some embodiments described herein include systems and methods for stitching advertisements in streaming content. For example, advertisements may be provided during playback of streaming content without requiring an operator to have previously tagged insertion points. In some embodiments, a server system scans streaming content for a set of sequential black frames. In some embodiments, an insertion point may be automatically registered (e.g., without requiring user input) by the server system upon locating a first black frame. In some embodiments, an insertion point may be automatically registered by the server system only upon detecting a second black frame. In some embodiments, the server system may ignore any sequential black frames thereafter. In some embodiments, an insertion point may be automatically registered by the server system upon locating the last black frame in a sequence of one or more black frames. In some embodiments, the server system may look to see if the next frame is also a black frame, and automatically register the insertion point only if the next frame is a video content frame, as opposed to a black frame. In some embodiments, if the next frame is another black frame, the server system may clear a previous potential insertion point and generate a new insertion point at the next black frame. The server system may perform this process until an end of the streaming content is reached.

In some embodiments, one or more advertisements are provided in real-time for each of the registered insertion points. For example, a registered insertion point may trigger the server system to "pause" streaming of video content, and stream one or more advertisements before resuming the video content upon conclusion of the advertisements.

Figure 1:
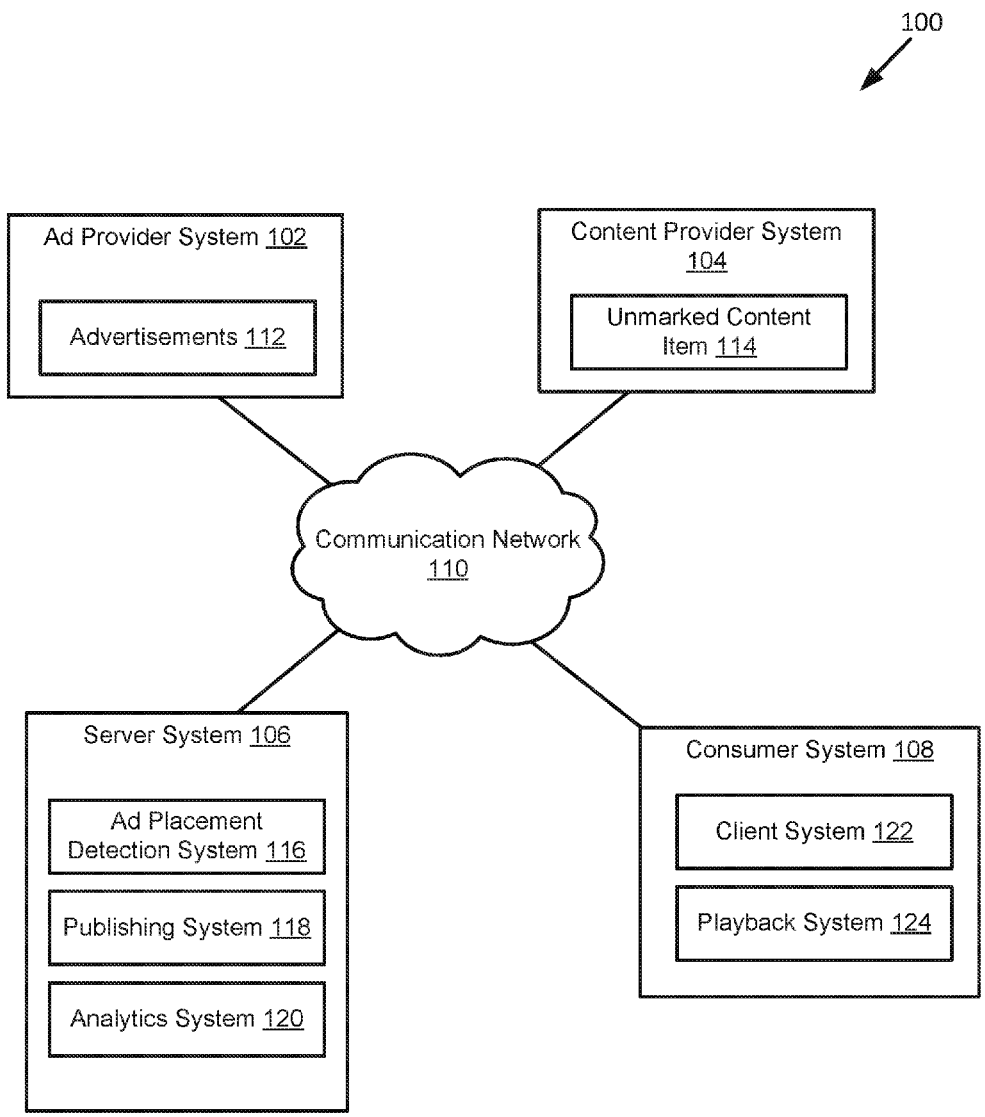
FIG. 1 depicts a block diagram illustrating a content delivery network system according to some embodiments.

FIG. 1 depicts a block diagram illustrating a content delivery network system 100 according to some embodiments. The system 100 includes an ad provider system 102, a content provider system 104, a server system 106, a consumer system 108, and a communication network 110.

The ad provider system 102 may be configured to store and provide advertisements 112. For example, the advertisements 112 may be video commercials that may be streamed at various points during playback of streaming content. As used in this paper, streaming content may include transactional video on demand content (or, "TVOD" content), over-the-top content (or, "OTT" content), ad supported video on demand content (or, "AVOD" content), subscription video on demand content (or, "SVOD" content), and the like. In some embodiments, functionality of the ad provider system 102 is performed by one or more workstations, desktop computers, laptop computers, mobile devices, or the like. It will be appreciated that one ad provider system 102 is shown for illustrative purposes, but other embodiments may include any number of such ad provider systems 102.

In some embodiments, the ad provider system 102 comprises a cloud-based system. For example, the ad provider system 102 may comprise a remote system. Alternatively, the ad provider system 102 may comprise a local system. For example, the ad provider system 102 may store local instances of advertisements retrieved from a remote system.

The content provider system 104 may be configured to store and provide unmarked content items 114. In some embodiments, functionality of the content provider system 104 is performed by one or more workstations, desktop computer, laptop computers, mobile devices, or the like. It will be appreciated that one content provider system 104 is shown for illustrative purposes, but other embodiments may include any number of such content provider systems 104.

In some embodiments, the unmarked content items 114 include stream-enabled videos (e.g., an episode of a show, a movie, or the like), or other on-demand content. As used in this paper, "unmarked" may indicate a content item includes frames of content (e.g., video content frames), and sets of indicator frames, but does not include timing information (e.g., time stamps) indicating when advertisements may be inserted in the content item and/or otherwise provided to a consumer in connection with streaming content. In some embodiments, the sets of indicator frames include frames that are each made up entirely of black pixels, and are used to determine when advertisements may be inserted in an unmarked content item and/or otherwise provided to a consumer system in connection with streaming unmarked content items. As follows, "marked" content items may include timing information indicating when advertisements may be inserted in the content item and/or otherwise provided to a consumer system in connection with streaming the marked content item.

In some embodiments, the content provider system 104 comprises a cloud-based system. For example, the content provider system 104 may comprise a Young Hollywood® system remote from other systems. Alternatively, the content provider system 104 may comprise a local system. For example, the content provider system 104 may store a local library of unmarked content items retrieved from a remote system, or otherwise.

The server system 106 may be configured to stitch one or more advertisements into playback of an unmarked content item. For example, functionality of the server system 106 may be performed by one or more workstations, desktop computers, laptop computers, mobile devices, or the like. In some embodiments, stitching may include automatically (e.g., without requiring user input) determining where advertisements may be inserted in an unmarked content item and/or otherwise be provided in connection with streaming unmarked content items. For example, the server system 106 may process a portion of a content item (e.g., a cached portion or streamed portion) until it identifies a sequence of black frames (e.g., two or more sequential frames, 1 second of black frames, etc.), and indicate that an advertisement should be provided at the identified position of the unmarked content item during playback.

In some embodiments, stitching may include adding an advertisement to an unmarked content item, although other embodiments may not add the advertisement to the unmarked content item. For example, stitching may indicate playback of the content item should be paused at a particular location (e.g., based on a location of sequential black frames), and one or more advertisements should be streamed while content playback is paused. Playback of the content item may be resumed upon conclusions of the one or more advertisements.

In some embodiments, the server system 106 is configured to stitch one or more advertisements in segments (or, "chunks") of an unmarked content item. For example, an unmarked content item may include 25 segments. The server system 106 may only process and/or store the segments known to have an insertion point (e.g., segments 4, 10, 11, 19, and 22-24). This may help, for example, reduce a load on the server system 106 by allowing other systems (e.g., the content provider system 104) to handle the remaining segments. Further discussion of segments may be found throughout this paper (e.g., with reference to FIGS. 8-10).

In some embodiments, the server system 106 includes an ad placement detection system 116, a publishing system 118, and an analytics and reporting system 120. The ad placement detection system 116 may be configured to process unmarked content items to detect, or otherwise identify, insertion points to provide one or more advertisements. In some embodiments, the ad placement detection system 116 scans a cached or buffered portion of an unmarked content item for an insertion point, e.g., a particular type of frame, a particular set of frames, a sequence of black frames or the like. For example, the ad placement detection system 116 may scan for a first black frame of the unmarked content item, a second black frame of the unmarked content item, a last black frame in a sequence of black frames of the unmarked content items, a time period (e.g., a second) of black frames of the unmarked content items, etc. When the insertion point is located, the ad placement detection system 116 may register the insertion point.

In some embodiments, the ad placement detection system 116 may reduce errors caused by incorrectly flagging multiple insertion points for a single intended insertion point. In some embodiments, the ad placement detection system 116 may cancel insertion points if they are back to back. For example, if a next frame after an insertion point is detected is also a black frame, it may be ignored (and possibly removed). This may help reduce errors during the stitching process. Subsequent black frames may be ignored and/or removed until the next frame of the unmarked content item comprises a non-black-frame, e.g., video content frame. Once a video content frame is located, the ad placement detection system 116 may reset and begin scanning for another first black frame, and the above process may be repeated.

In some embodiments, the ad placement detection system 116 may cancel insertion points if they are too close together, e.g., occurring within 10 minutes of the previous insertion point. In other embodiments, the ad placement detection system 116 may cancel insertion points if they are within a period of time set by a user, if they are within a configurable time period set by a manager of the server system 106, if they are within a period of time set according to a subscription-level of the viewer (e.g., one subscription level may provide advertisements no more often than every 10 minutes, one subscription level may provide advertisement no more often than every 30 minutes, one subscription level may never offer advertisements, etc.).

In some embodiments, the publishing system 118 is configured to stitch advertisements into content, and stream the stitched content. For example, the publishing system 118 may receive an unmarked content item, cache or buffer a portion of the unmarked content item, evaluate the unmarked content item for insertion points, provider consumer system attributes for receiving targeted advertisements, insert the advertisements into the insertion points, and stream the stitched content. In some embodiments, the publishing system 118 may stop, or pause, streaming of the unmarked content item while streaming advertisements, although other embodiments may stream both simultaneously, e.g., to allow the consumer to buffer a portion of the unmarked content item while the one or more advertisements are being played.

In some embodiments, the publishing system 118 is configured to format advertisements and unmarked content items without requiring input from a user (e.g., an operator). For example, the publishing system 118 may receive consumer system attributes of a consumer system, such as an operating system type, a playback player type, a browser type, a network connection speed, a screen display size and/or resolution, and so forth. The publishing system 118 may format the advertisements and unmarked content items based on the consumer system attributes. In some embodiments, the advertisements and unmarked content items are pre-formatted, and are not formatted by the publishing system 118, or other component of the server system 106.

In some embodiments, the analytics and reporting system 120 is configured to analyze and report streaming attributes of a streaming session (e.g., streaming a particular unmarked content item), streaming sessions associated with a particular consumer system, streaming sessions associated with group of consumer systems, and the like. For example, streaming attributes may include the duration of a streaming session, a number of advertisements provided during a stream session, the number of advertisements provided for each advertising segment of a streaming session, and so forth. An advertisement segment may include the one or more advertisements associated with a particular insertion point. For example, three advertisements may be stitched in an unmarked content item for a single insertion point.

In some embodiments, the analytics and reporting system 120 generates predictive models for determining how many advertisements to stitch for each insertion point, and which consumer system attributes to provide for selection of advertisements. For example, the analytics and reporting system 120 may log that a particular consumer system was provided with three different advertisement segments during streaming of an unmarked content item. The analytics and reporting system 120 may log the number of click-throughs generated by the advertisements, and/or the number of advertisements that were fast-forward or skipped. For example, if advertisements in a particular segment resulted in less click-throughs and/or more fast-forwards or skips than segments with two advertisements, then the predictive model may indicate that two advertisements should be provided per segment.

In some embodiments, the predictive model may be predefined (e.g., for a particular consumer system or a group of consumer systems), although in other embodiments, the predictive model may be dynamic. For example, as consumer system attributes and/or streaming attributes change, the predictive model may be updated. This may allow, for example, the analytics and reporting system 120 to provide more accurate metrics, and account for streaming habits of particular consumer systems.

In some embodiments, the server system 106 comprises a cloud-based system. For example, the server system 106 may comprise an AWS system remote from other systems. Alternatively, the server system 106 may comprise a local system connected to one or more other systems through local area connections and/or wide area connections.

The consumer system 108 may be configured to stream and playback unmarked content items and advertisements. For example, functionality of the consumer system 108 may be performed by one or more mobile device (e.g., smartphones, cell phones, smartwatches, tablet computers, or the like), desktop computers, laptop computers, workstations, or the like. In some embodiments, the consumer system 108 includes client system 122 and playback system 124. The consumer system 122 may be configured to receive and provide data (e.g., streaming data), generate graphical user interfaces, receive user inputs, and the like. For example, the client system 122 may comprise a web browser (e.g., IE, Firefox, Chrome, Safari, etc.).

The playback system 122 may be configured to playback streaming data, including unmarked content items and advertisements. In some embodiments, the streaming data comprises segments. For example, the playback system 122 may comprise a QuickTime® player, Real® player, web browser component, and the like. In some embodiments, the playback system 122 may be configured to perform a variety of different playback functions. For example, the playback system 122 may pause, terminate, advance (e.g., fast-forward or skip), or rewind unmarked content items and/or advertisements. In some embodiments, particular playback functions (e.g., e.g., fast-forward or skip) may be restricted. For example, a particular streaming session may only allow a limited number of fast-forwards or skips.

In some embodiments, the communication network 110 represents one or more computer networks (e.g., LAN, WAN, or the like). The communication network 110 may provide communication between any of the ad provider system 102, the content provider system 104, the server system 106, and the consumer system 108. In some implementations, the communication network 110 comprises computing devices, routers, cables, buses, and/or other network topologies. In some embodiments, the communications network 110 may be wired and/or wireless. In various embodiments, the communications network 110 may comprise the Internet, one or more networks that may be public, private, IP-based, non-IP based, and so forth.

Figure 2:
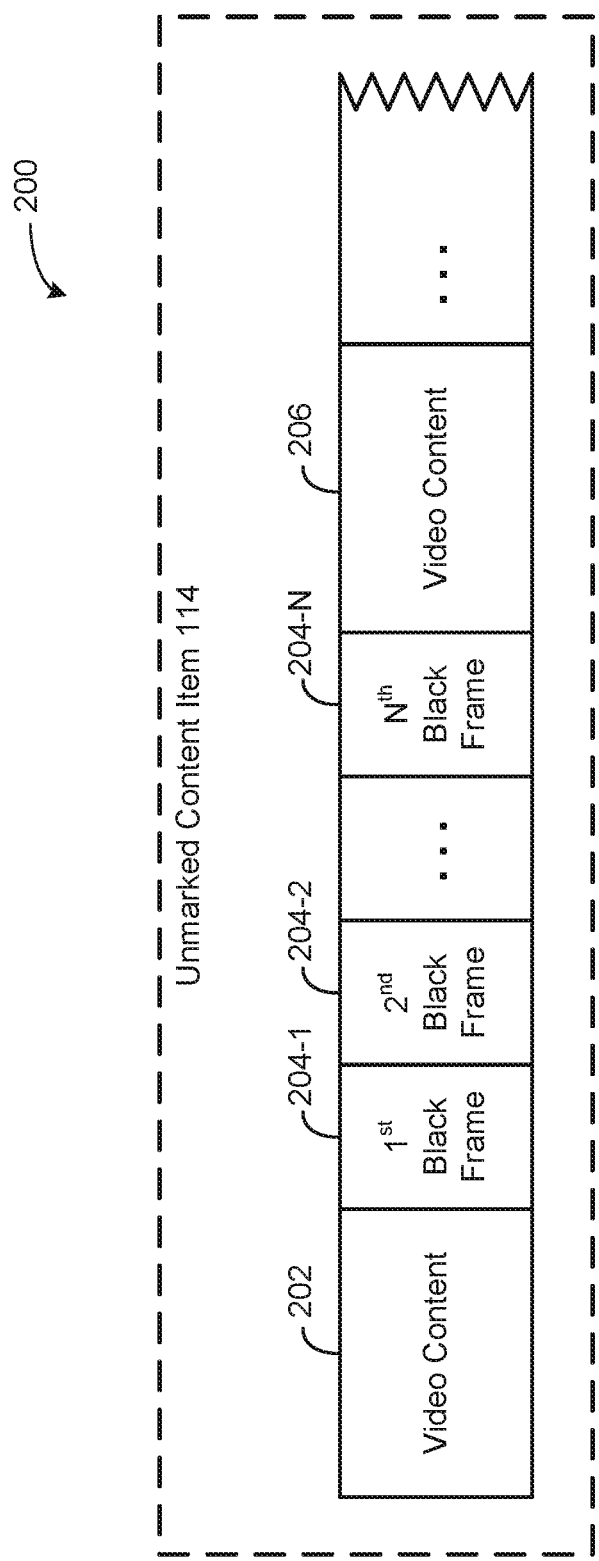
FIG. 2 depicts a block diagram illustrating details of an unmarked content item according to some embodiments.

FIG. 2 depicts a block diagram 200 illustrating details of an unmarked content item 114 according to some embodiments. The unmarked content item 114 includes a first video content portion 202, a set of black frames 204-1 to 204-n, and a second video content portion 206. It will be appreciated that the content item 114 may include any number of video content portions and sets of black frames. For example, the content item 114 may include six video content portions, and five sets of black frames, which may indicate the content item 114 is configured for five different advertisement segments. In various embodiments, one or more advertisements may be provided for each advertisement segment.

Figure 3:
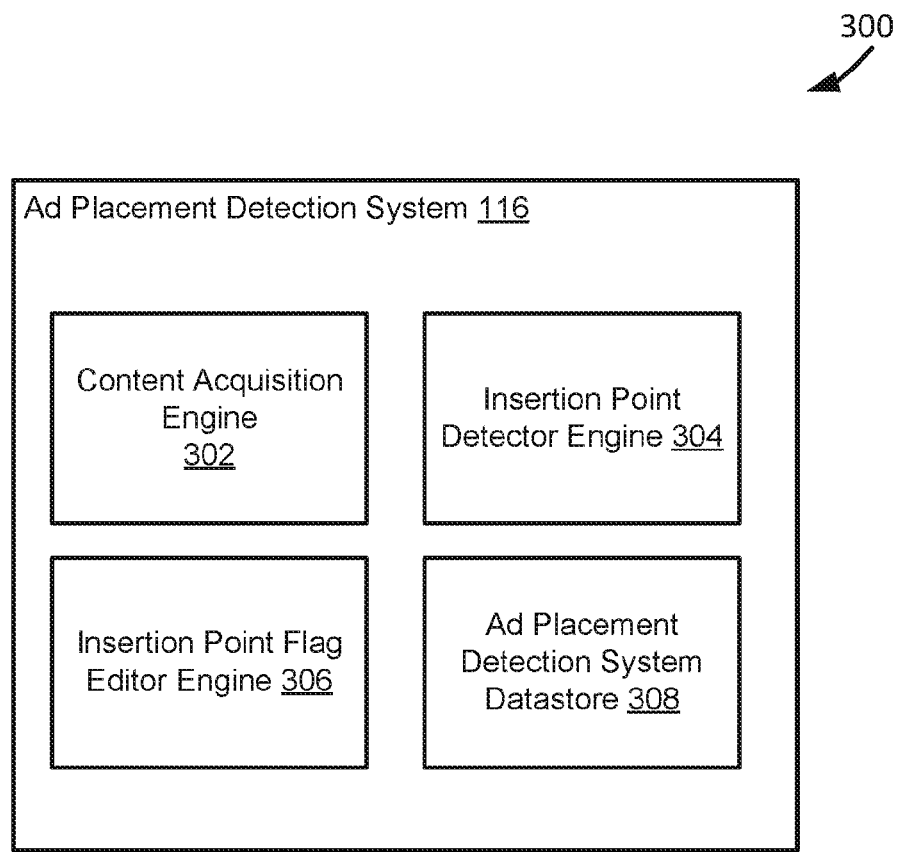
FIG. 3 depicts a block diagram illustrating details of the advertisement placement detection system according to some embodiments.

FIG. 3 depicts a block diagram 300 illustrating details of the advertisement placement detection system 116 according to some embodiments. In some embodiments, the advertisement detection system 116 includes a content acquisition engine 302, an insertion point detection engine 304, an insertion point flag editor engine 306, and an advertisement placement detection system datastore 308. Like many other elements noted herein, the insertion point flag editor 306 is optional.

The content acquisition engine 302 may be configured to acquire unmarked content items. In some embodiments, the content acquisition engine 302 receives a data stream of one or more unmarked content items. For example, the content acquisition engine 302 may comprise an implementation of the Real Time Streaming Protocol (RTSP). The acquired unmarked content items may be stored at least temporarily (e.g., cached or buffered) in the advertisement placement detection system datastore 308. As used in this paper, datastores may be any structure and/or structures suitable for storing data at least temporarily (e.g., a cache, a buffer, an active database, a relational database, a self-referential database, a table, a matrix, an array, a flat file, a documented-oriented storage system, a non-relational No-SQL system, an FTS-management system, and the like).

The insertion point detection engine 304 may be configured to detect insertion points of an unmarked content item for stitching one or more advertisements. In some embodiments, an insertion point indicates a position within the unmarked item. For example the insertion point detection engine 304 may scan a cached or buffered portion of the unmarked content item for a frame or set of frames having a particular set of one or more frame detection attributes (e.g., scan for a first black frame, a second black frame, an n-th black frame, a last frame within a sequence of one or more black frames, a time-period of black frames, etc.). In some embodiments, frame detection attributes include a pixel color (e.g., black). In some embodiments, the frame may be deemed to have the frame detection attribute, e.g., may be deemed to be black, if a threshold number, percentage or pattern of pixels have the attribute (e.g., all pixels are black, a diagonal of the frame is black, both diagonals are black, certain predetermined points are black, etc.).

The insertion point detection engine 304 may be configured to ignore some insertion points based on predetermined criteria, e.g., if the previous insertion point is within a certain number of frames or too proximate in time, if the previous insertion point is too proximate in time based on a subscription level of the user, or the like. In some embodiments, the insertion point detection engine 304 may register the insertion point, possibly along with timing information (e.g., 5 m: 13 s of the unmarked content item 114). In some embodiments, the insertion point detection engine 304 may remove one or more frames with the set of one or more frame detection attributes (e.g., black frames) from the unmarked content item. In some embodiments, the insertion point detection engine 304 may ignore and/or remove any number of frames until a video content frame is reached. This process may help, for example, prevent erroneous insertion point detections.

The insertion point flag editor engine 306 may be configured to insert a custom frame indicating an insertion point for stitching one or more advertisements. For example, upon registering an insertion point based on locating a sequence of black frames, the insertion point flag editor engine 306 may replace the black frames with the custom frame. Then, in future passes, the insertion point detection engine 304 may scan an unmarked content item for a frame matching the custom frame. In some embodiments, the custom frame may comprise particular set of one or more frame detection attributes. For example, the custom frame may include a logo (e.g., a "SnifferCat" logo). This may be done in real-time, e.g., in connection with streaming of the unmarked content item, and/or it may done in an "offline" or batch process.

Figure 4:
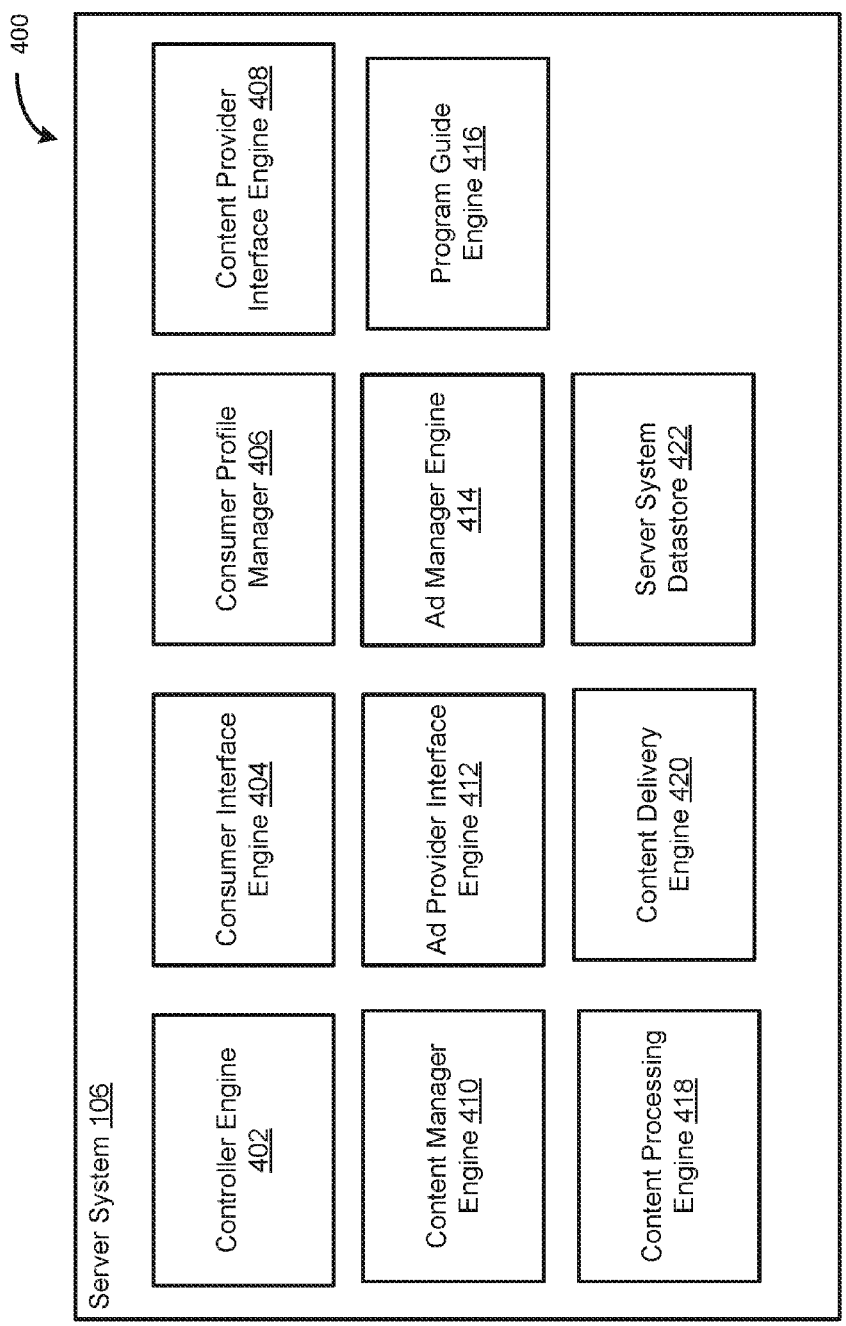
FIG. 4 depicts a block diagram illustrating details of the publishing system according to some embodiments.

FIG. 4 depicts a block diagram 400 illustrating details of the publishing system 118 according to some embodiments. In some embodiments, the publishing system 118 includes a controller engine 402, a consumer interface engine 404, a consumer profile manager 406, a content provider interface engine 408, a content manager engine 410, an advertisement provider interface engine 412, an advertisement manager engine 414, a program guide engine 416, a content and advertisement processing system (or, "content processing system") 418, a content and advertisement delivery system (or, "content delivery system") 420, and a publishing system datastore 422.

The controller engine 402 may be configured to control functionality and/or interaction of some or all of the engines 404-420 and the publishing systems datastore 422. In some embodiments, the controller engine 402 manages the datastore 422. For example, the controller engine 402 may cache or buffer received streaming content (e.g., unmarked content item 114) in the datastore 422, read cached or buffered content from the datastore 422, update cached or buffered content in the datastore 422, delete cached or buffered content in the datastore 422, and so forth.

The consumer interface engine 404 may be configured to request and receive consumer profile information over a communications network to generate consumer profiles associated with consumer systems. For example, a consumer profile may be used to format unmarked content items for presentation by a corresponding consumer systems, format advertisements for presentation by a corresponding consumer system, select consumer system attributes for requesting advertisements, recommend unmarked content items, and the like. In some embodiments, the consumer interface engine 404 may comprises an implementation of the HTTP or HTTPS protocol.

The consumer profile manager 406 may be configured to manage (e.g., create, read, update, delete, or otherwise access) consumer profiles. For example, consumer profiles may be stored in the datastore 422. In some embodiments, consumer profiles may store computer hardware attributes, demographic attributes, geographic attributes, psychographic attributes, and the like. For example, consumer profiles may store some or all of the following information:

Consumer Profile Identifier: identifies the consumer profile.

OS: an operating system of an associated consumer system (e.g., Windows, MacOS, Linux, etc.).

Network Connection: speed (e.g., 5 Mb/s) and/or type of connection (e.g., LAN, WAN, wireless, wired, etc.).

Display: display attributes of an associated consumer system (e.g., screen size, screen resolution, etc.).

Audio: audio attributes of an associated consumer system.

Device Type: type of device of an associated consumer system (e.g., mobile device, laptop computer, desktop computer, etc.)

Gender: gender of the consumer associated with the consumer profile.

Name: name of the consumer associated with the consumer profile.

Age: age of the consumer associated with the consumer profile.

Geographic Location: a current location of the of the consumer associated with the consumer profile, e.g., as determined by a location service and/or specified by the consumer.

Content Viewing History: a history of the content streamed by a consumer or associated system. For example, a list of streamed titles, timestamp information, and so forth.

Advertisement Viewing History: a viewing history of advertisements. For example, a list of streamed advertisements, a list of advertisements that resulted in click-throughs or other related activity (e.g., viewing ad sponsor website), a list advertisements skipped or fast-forwarded, and the like.

The content provider interface engine 408 may be configured to request and receive unmarked content items over a communication network. In some embodiments, the content interface engine 408 comprises an implementation of the RTSP protocol.

The content manager engine 410 may be configured to manage (e.g., create, read, update, delete, or otherwise access) locally stored (e.g., streamed, cached, buffered, etc.) unmarked content items. For example, unmarked content items may be locally stored, at least temporarily, in the datastore 422. For example, unmarked content items may include some or all of the following information:

Content Item Identifier: identifies the unmarked content item.

Content: the stream-enabled data of the unmarked content item.

Content Format: a media format of the unmarked content item (e.g., MPEG, MOV, AVI, etc.).

Display Quality: display attributes of the unmarked content item (e.g., resolution, recommended screen size, color quality, audio quality, etc.)

Video Content Time: the duration of video content included in the unmarked content item. For example, the running time of an episode of a show.

Title: a title of the content (e.g., "Seinfeld, S1, Ep. 2").

Genre: a genre of the unmarked content item (e.g., comedy, drama, action, etc.).

In some embodiments, the content manager 410 formats, or otherwise modifies, unmarked content items. For example, the content manager engine 410 may format an unmarked content item based on consumer profile attributes associated with a target computer system.

The advertisement provider interface engine 412 may be configured to request and receive advertisements over a communication network. In some embodiments, the advertisement provider interface engine 412 may comprises an implementation of the VAST protocol.

The advertisement manager engine 414 may be configured to manage (e.g., create, read, update, delete, or otherwise access) locally stored (e.g., streamed, cached, buffered, etc.) advertisements. For example, advertisements may be at least temporarily stored in the datastore 422. For example, advertisements may include some or all of the following information:

Advertisement Identifier: identifies the advertisement.

Advertisement: the stream-enabled data of the advertisement.

Advertisement Format: a media format of the advertisement (e.g., MPEG, MOV, AVI, etc.).

Display Quality: display attributes of the advertisement (e.g., resolution, recommended screen size, color quality, audio quality, etc.)

Advertisement Time: the duration of advertisement. For example, the running time of the advertisement.

Title: a title of the advertisement.

Genre: a genre of the advertisement (e.g., sports, home improvement, dining, shopping, etc.).

In some embodiments, the advertisement manager engine 414 formats, or otherwise modifies, advertisements. For example, the advertisement manager engine 414 may format an advertisement based on consumer profile attributes associated with a target computer system.

In some embodiments, the advertisement manager engine 414 selects consumer system attributes for receiving targeted advertisements. For example, advertisements may be selected by the ad provider system 102 based on one or more consumer profile attributes associated with a streaming target. In some embodiments, the consumer system attributes may be selected in real-time (e.g., while the associated unmarked content item is streaming to the target), and/or prior to streaming (or, "offline").

The program guide engine 416 may be configured to provide a guide of unmarked content items (or, a "content listing"). For example, the guide may be presented to a consumer system for selecting unmarked items. In some embodiments, the guide may comprise a graphical user interface (GUI) that may be displayed on a consumer system. In some embodiments, the program guide engine 416 provides content mappings (or, "mappings") to store unmarked content items. For example, the unmarked content items may be stored locally (e.g., in the datastore 422), and/or remotely (e.g., by the content provider system 104). The mappings may be used to retrieve unmarked content items for streaming to a consumer system 108. For example, a consumer system 108 may browse and select unmarked content items through the guide, and the selected unmarked content items may be retrieved based on the mappings.

In some embodiments, unmarked content items may be retrieved in segments which may improve streaming quality and/or performance. For example, a first segment may be retrieved based on the mappings (e.g., streamed from a content provider system 104 to the consumer system 108). At the end of the first segment, or within a proximity to an end of the first segment, e.g., to allow for buffering of subsequent segments, a second segment may be retrieved based on the mappings (e.g., streamed from the server system 106 to consumer system 108).

In some embodiments, the program guide engine 416 may be configured to generate mappings for segments of the same unmarked content item stored in different locations. For example, the mappings may indicate a first set of segments (e.g., segments including at least one insertion point) are stored on the server system 106, and a second set of segments (e.g., segments without any insertion points) are stored on the content provider system 104. The mappings may be stored, for example, in the server system database 422. In some embodiments, based on the mappings, the first set of segments may be streamed to the consumer system 108 from the server system 106, and the second set of segments may be streamed from the content provider system 104.

The content processing engine 418 may be configured to stitch advertisements in unmarked content items. In some embodiments, the content processing engine 418 modifies an unmarked content item to include the advertisement data in the data of the unmarked content item. For example, it may replace a set of sequential black frames with one or more advertisements. In other embodiments, the content processing engine 418 triggers streaming of one or more advertisements upon reaching a registered insertion point, without necessarily modifying the unmarked content item.

In some embodiments, the content processing engine 418 calculates a "true time" of unmarked content items. For example, an unmarked content item may include video content, and black frames indicating insertion points for advertisements. The duration of the video content, or "running time," may be 22 minutes, for example. The true time may be calculated based on the running time and the duration of any stitched advertisements. For example, if a segment of two advertisements totaling one minute is stitched at a first insertion point, and a segment of three advertisements totaling one minute and thirty seconds is stitched at a second insertion point, the true time may be twenty-four minutes and thirty seconds. The true time may be reflected in a status indicator (e.g., a scroll bar) presented to a consumer while viewing the streamed unmarked content item and/or advertisements.

In some embodiments, the true time may be calculated dynamically, and/or prior to initiating streaming of the unmarked content item. For example, if advertisements are received prior to streaming, the true time may similarly be calculated prior to streaming. Alternatively, if advertisements are received in real-time (e.g., during streaming of the unmarked content item), the duration of the advertisements may be unknown prior to streaming, and the true time may be calculated during streaming.

The content delivery engine 420 may be configured to provide unmarked content items and advertisements for playback by consumer systems. For example, the content delivery engine 420 may stream unmarked content items and advertisements over a communication network. As discussed above, in various embodiments, unmarked content items may be streamed in segments, which may improve streaming quality and/or performance. For example, a first segment may be streamed, and at the end of the first segment, or within a proximity to an end of the first segment, e.g., to allow for buffering of subsequent segments, a second segment may be streamed.

Figure 5:
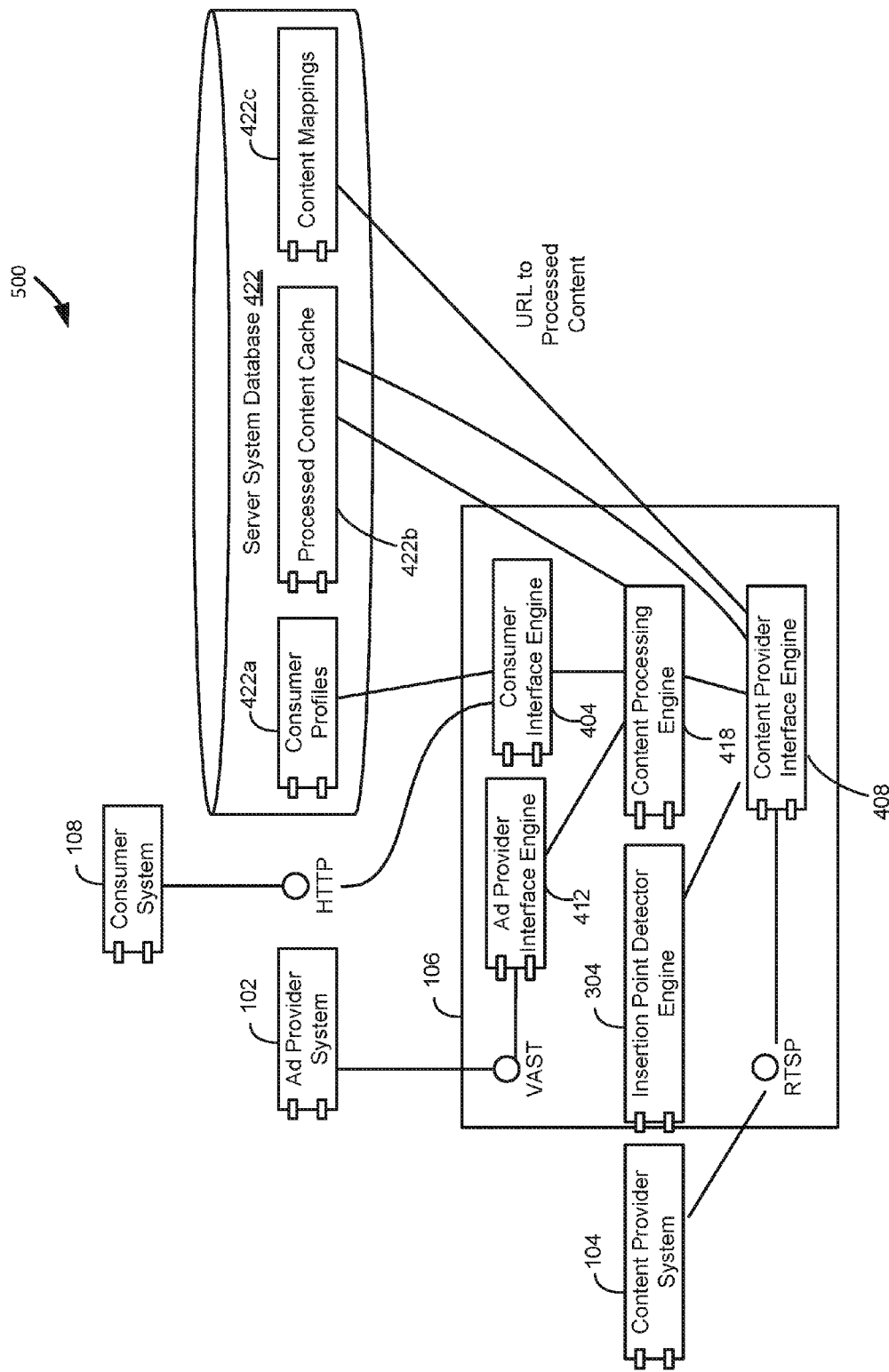
FIG. 5 depicts a block diagram illustrating details of a content delivery network system according to some embodiments.

FIG. 5 depicts a block diagram 500 illustrating details of a content delivery network system 100 according to some embodiments. As shown, a server system database 422 stores consumer profiles 422a, a processed content cache 422b, and content mappings 422c. A consumer system 108 provides an HTTP request for an unmarked item to a consumer interface engine 404. The consumer interface engine 404 retrieves a corresponding profile from the server system database 422. The content provider interface engine 408 retrieves the requested unmarked content item from a content provider system 104 using an RTSP protocol. An insertion point detector engine 304 processes the unmarked content item to detect and register one or more insertion points. The processed unmarked content item is stored in the processed content cache 422. A content processing engine 418 selects one or more advertisements based on the corresponding profile, and an ad provider interface engine 412 retrieves the selected advertisements from an ad provider system 102 using a VAST protocol. The server system 106 may stream the processed unmarked content item to the consumer system 108 in segments based on the content mappings 422c.

Figure 6:
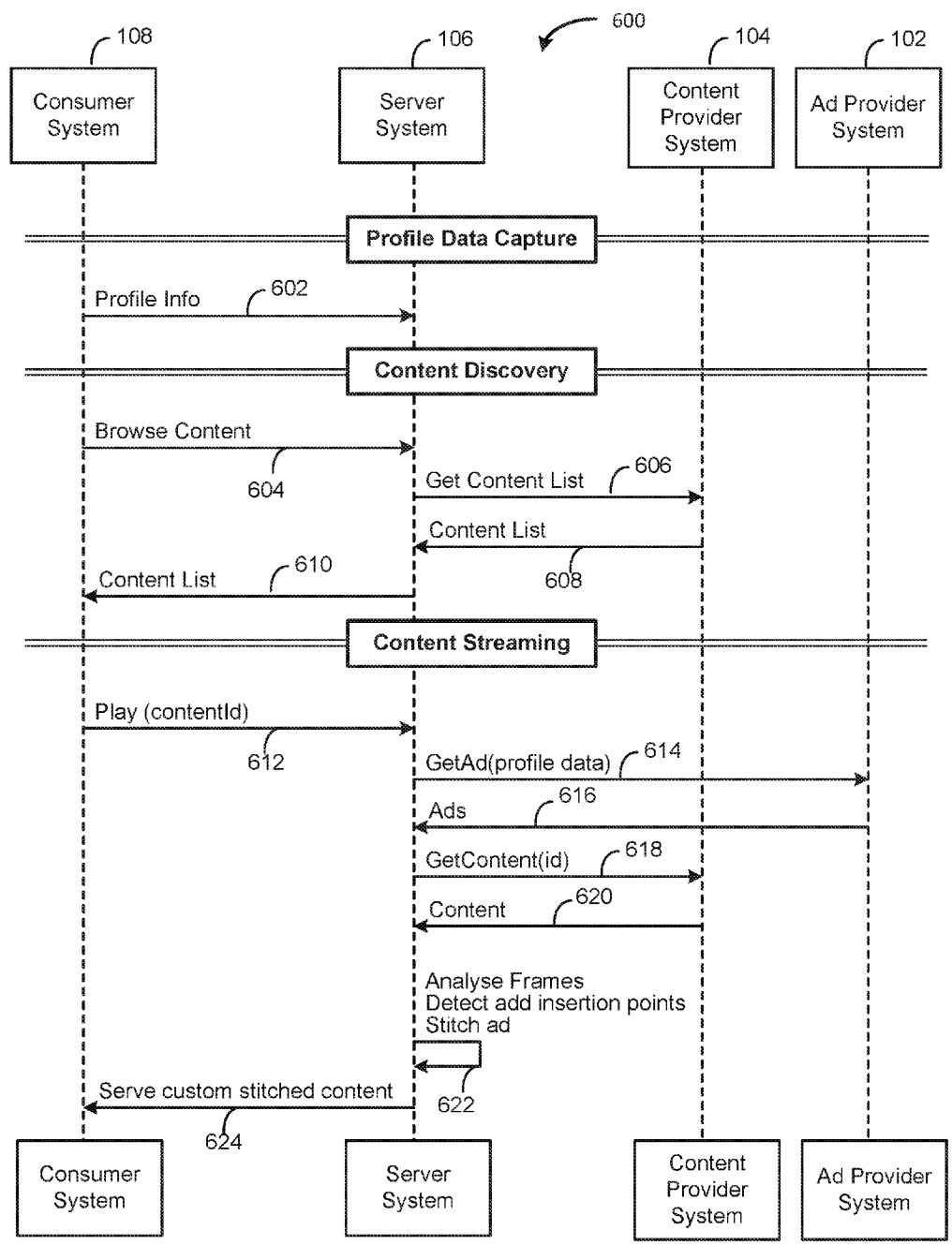
FIG. 6 depicts a flowchart illustrating a method of stitching one or more advertisement in streaming content according to some embodiments.

FIG. 6 depicts a flowchart 600 illustrating a method of stitching one or more advertisements in streaming content (e.g., an unmarked content item 114) according to some embodiments. In this and other flowcharts, the flowchart shows by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 602, a consumer system 108 provides consumer profile information to a server system 106. For example, the server system 106 may obtain the information in response to an account registration request. In some embodiments, the client system 122 of the consumer system 108 transmits the consumer profile information over a communication network 110, and a consumer interface engine 404 of the server system 106 receives the consumer profile information over the communication network 110. Profile information can be obtained from other means, e.g., from social networks, from monitoring user content choices, from content providers (e.g., Netflix), from search companies (e.g., Google), etc.

In step 604, the consumer system 108 transmits a request for a content list to the server system 106. In some embodiments, a program guide engine 416 of the server system 106 receives the request.

In step 606, the server system 106 transmits a request for the content list to a content provider system 104. In some embodiments, a content provider interface engine 408 transmits the request.

In step 608, the content system 104 transmits the content list to the server system 106. In some embodiments, the content provider interface engine 408 of the server system 106 receives the content list.

In step 610, the server system 106 transmits the content list to the content provider system 104. The content provider system 104 presents the content list to a consumer. In some embodiments, a client system 122 receives and displays the content list.

In step 612, the consumer system 108 transmits a request for playback of a selected unmarked content item. In some embodiments, a client system 122 submits the request.

In step 614, the server system 106 transmits a request to the ad provider system 102 for one or more advertisements to stitch into the unmarked content item. In some embodiments, the ad provider interface engine 412 issues the request. In some embodiments, the request is based on one or more attributes of the consumer system 108.

In step 616, the ad provider system 102 provides the one or more advertisements to the server system 106. In some embodiments, the advertisement interface engine 412 receives the one or more advertisements.

In step 618, the server system 106 transmits a request to the content provider system 104 for the selected unmarked content item. In some embodiments, a content provider interface engine 408 issues the request.

In step 620, the content provider system 104 provides the selected unmarked content item to the server system 106. In some embodiments, the content provider system 104 downloads the unmarked content item, and the content provider interface engine 408 receives the download. In some embodiments, the content provider system 104 provides the entire content. In some embodiments, the content provider system 104 provides only the content that has not been previously downloaded to the server system 106. In some embodiments, the content provider system 104 provides the content in segments.

In step 622, the server system 106 process the unmarked content item and automatically identifies one or more insertion points. In some embodiments, the content processing engine 418 performs the identification. The server system 106 further stitches the one or more advertisements in the detected insertion points. In some embodiments, the content processing engine 418 performs the stitching.

In step 624, the server system 106 transmits the stitched content to the consumer system 108. In some embodiments, the server system 106 may insert the advertisement into the content at the insertion point and stream the stitched content. In some embodiments, the server system 106 may stream the unmarked content item to the consumer system 108 until an insertion point is reached. Once an insertion point is reached, the server system 106 may stream of the unmarked content item may be paused, and the server system 106 may stream the one or more advertisements. After completing the advertisements, the server system 106 may resume streaming the unmarked content item. The server system 106 may repeat for each insertion point. In some embodiments, the content delivery engine 420 of the server system 106 provides the stitched content.

Figure 7:
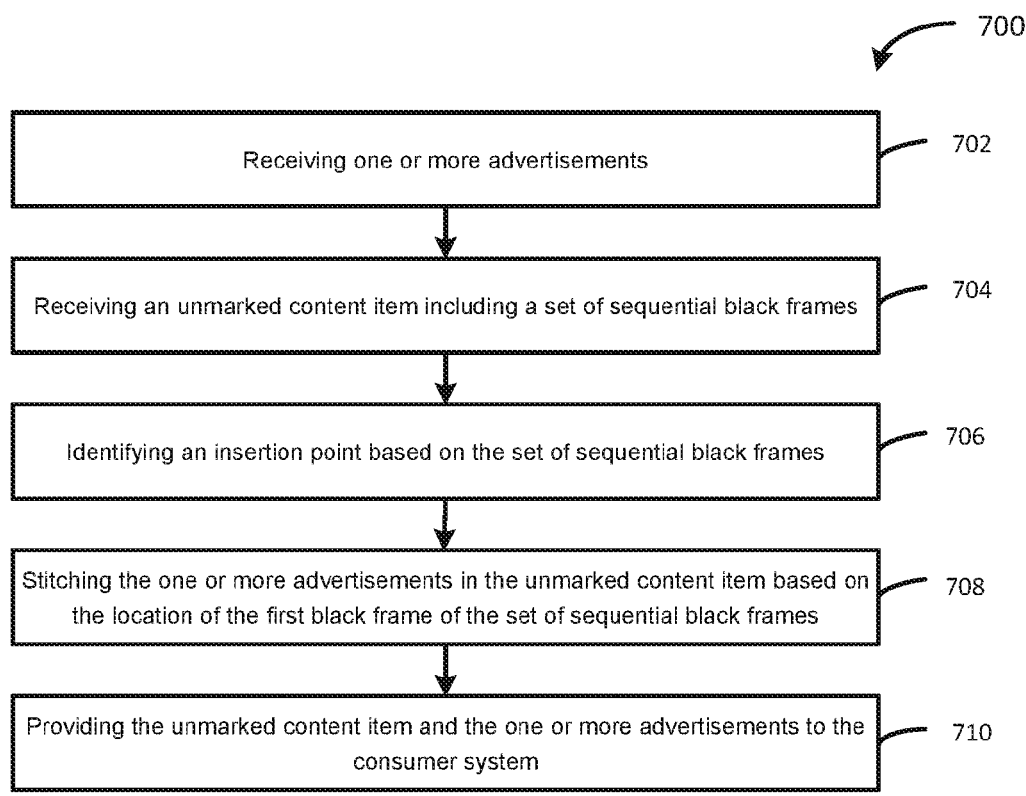
FIG. 7 depicts a flowchart illustrating a method of operation of a server system for stitching one or more advertisements in streaming content according to some embodiments.

FIG. 7 depicts a flowchart 700 illustrating a method of operation of a server system 106 for stitching one or more advertisements in streaming content according to some embodiments.

In step 702, an advertisement interface engine 404 receives one or more advertisements 112, and a controller engine 402 stores them at least temporarily (e.g., cached or buffered) in a server system datastore 422.

In step 704, a content interface engine 408 receives the unmarked content item 114, and the controller engine 402 stores it at least temporarily (e.g., cached or buffered) in the server system datastore 422. The unmarked content item may comprise a stream-enabled video including a set of one or more sequential black frames.

In step 706, an insertion point detector engine 304 identifies an insertion point based on a location of at least one black frame of the set of sequential black frames. In some embodiments, the insertion point is ahead of a current playback point of the unmarked content item 114 streaming to the consumer system.

In step 708, a content processing engine 418 stitches one or more advertisements in the unmarked content item at the insertion point. In some embodiments, the content processing engine 418 may add the one or more advertisements to the unmarked content, e.g., by replacing the black frames with the frames of the one or more advertisements. In other embodiments, the content processing engine 418 does not modify the unmarked content item, and instructs a content delivery engine 422 to stream the one or more advertisements after pausing the content playback upon reaching the insertion point.

In step 710, the content delivery system 422 streams the unmarked content item 114 to the consumer system 108 until the insertion point is reached, and streams the one or more advertisements to the consumer system 108 when the insertion point is reached.

Figure 8:
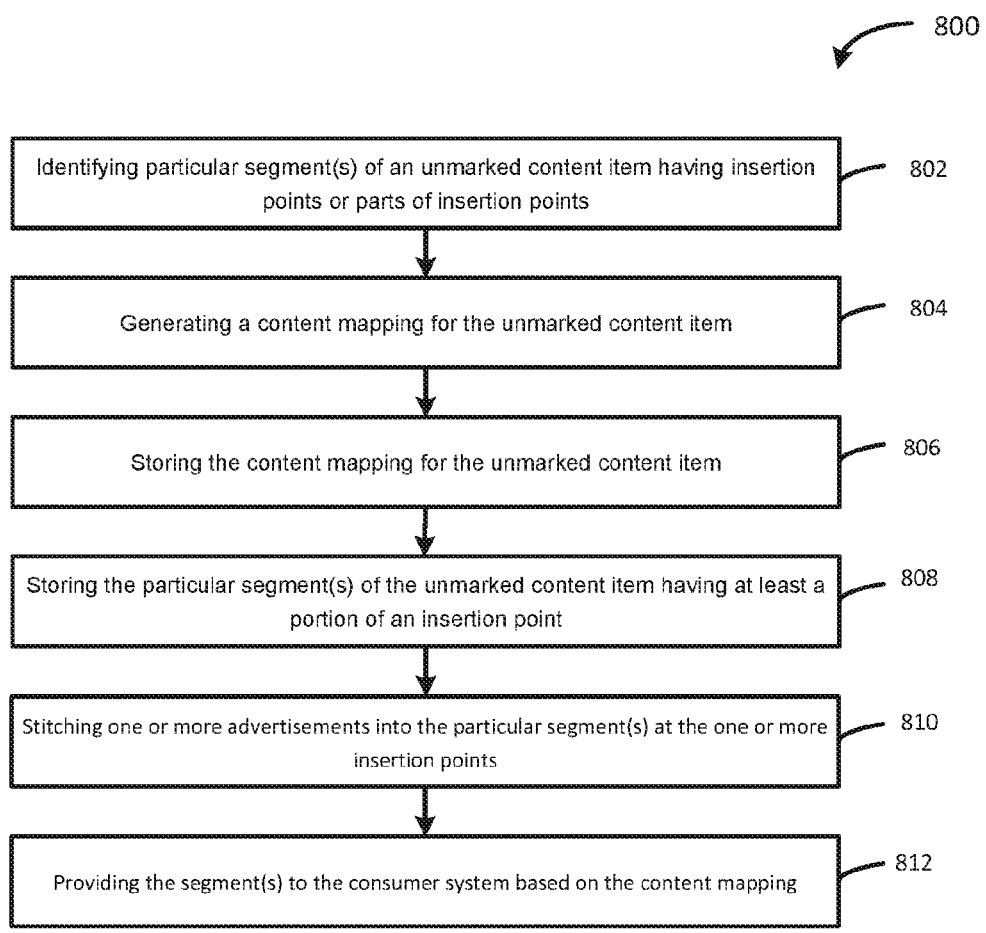
FIG. 8 depicts a flowchart illustrating a method of operation of a server system for stitching one or more advertisements in segments of streaming content according to some embodiments.

FIG. 8 depicts a flowchart 800 illustrating a method of operation of a server system 106 for stitching one or more advertisements in particular segments of streaming content according to some embodiments. As discussed above, unmarked content items may be streamed in segments. In some embodiments, particular segments of an unmarked content item may be streamed by the server system 106, and the remaining segments of the unmarked content item may be provided by a remote system (e.g., a content provider system 104). This may help to reduce a load on the server system 106 by requiring the server system 106 only to process and/or stream particular segments (e.g., segments with insertion points) of unmarked content items.

In step 802, a content processing engine 418 identifies segments of an unmarked content item. For example, an unmarked content item for a 22-minute episode of a show may have 25 segments. In some embodiments, one or more particular segments of the unmarked content item includes at least one insertion point (e.g., identified by a set of one or more sequential black frames), and the remaining segments include only video content without any insertion points. For example, the first two segments may not have any insertion points, the third segment may include an insertion point, and so forth.

In some embodiments, an insertion point may be wholly included in a single segment, or be spread across a plurality of segments. For example, a set of sequential black frames may be included within a particular segment or between two segments (e.g., between segments three and four).

In some embodiments, the server system 106 identifies offline segments with insertion points, e.g., as part of a batch identification process. For example, a content provider system 104 may maintain a library of unmarked content items. Accordingly, in some embodiments, the server system 106 may identify segments having insertion points prior to a consumer system 108 requesting a stream of a selected unmarked content item.

In step 804, a program guide engine 416 generates a content mapping for the unmarked content item. In some embodiments, the content mapping comprises a table or other structure indicating a location of each segment of the unmarked content item from which the player is to obtain the segment. For example, segments without insertion points may be stored on the content provider system 104 and retrieved by the player using URLs identifying the locations on the content provider system 104, and the segments having insertion points may be stored on server system 106 and retrieved by the player using URLs identifying the locations on the server system 106.

In step 806, a controller engine 402 stores the content mapping in a server system datastore 422. In various embodiments, some or all of the content map may be provided to the consumer system 108 to facilitate selection and playback of the unmarked content item. For example, after selecting an unmarked content item for streaming, the server system 106 may provide the URLs for each segment of the unmarked content item to the consumer system 108. The consumer system 108 may then playback the unmarked content item by sequentially navigating to the individual URLs.

In step 808, the content manager engine 410 stores the particular segments of the unmarked content item having at least a portion of an insertion point. For example, for an unmarked content item comprising 25 segments, in which segments 1-3, 5-9, 12-18, 20-21, and 25 do not include at least a portion of an insertion point, and segments 4, 10, 11, 19, and 22-24 each include at least a portion of an insertion point, the server system 106 may store segments 4, 10, 11, 19, and 22-24.

In step 810, the content processing engine 418 stitches one or more advertisements in the particular segments at the one or more insertion points. Continuing the example above, the server system 106 may stitch advertisements in segments 4, 10, 11, 19, and 22-24 of the 25-segment unmarked content item. In some embodiments, the server system 106 may append the one or more advertisements within the particular segments, e.g., by replacing the black frames with the frames of the one or more advertisements. In other embodiments, the server system 106 does not modify the particular segments, and streams the one or more advertisements after pausing the content playback upon reaching an insertion point. Accordingly, it will be appreciated that, in some embodiments, "stitched content" may include content items that have not necessarily been modified, or content items that have been modified.

In step 812, the content provider system 104 provides the segments without the insertion points and the server system 106 provides the stitched segments to the consumer system 108. Continuing the example above, the content provider system 104 may stream its segments 1-3, 5-9, 12-18, 20-21, and 25 to the consumer system 108. The server system 106 may stream segments 4, 10, 11, 10 and 22-24 to the consumer system 108. The server system 106 may provide the advertisements at the determined delivery time during playback of its particular segments. In some embodiments, the content delivery processing engine 420 provides the stitched segments.

Figure 9:
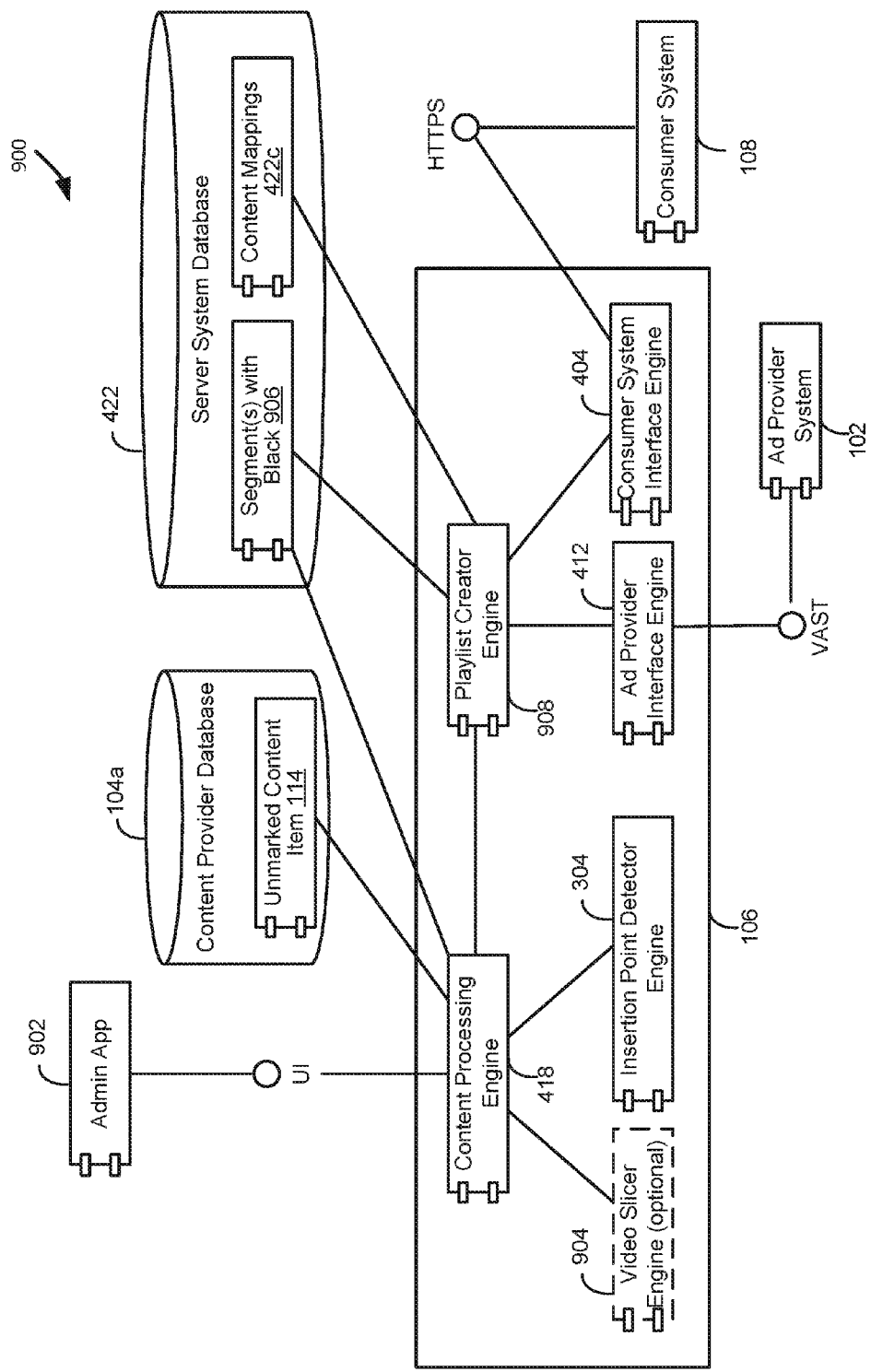
FIG. 9 depicts a block diagram illustrating details of a content delivery network system according to some embodiments.

FIG. 9 depicts a block diagram 900 illustrating details of a content delivery network system 100 according to some embodiments. As shown, the content provider database 104*a* stores an unmarked content item 114. The insertion point detector engine 304 detects one or more insertion points in the unmarked content item 114 (e.g., as indicated by a set of sequential black frames). The admin app 902 may verify the insertion points and/or modify the insertion points. For example, the admin app 902 may replace sequential insertion points with a single insertion point. The optional video slicer engine 904 may slice the unmarked content item 114 based on segments with at least one insertion point, and segments without any insertion points. In some embodiments, the unmarked content item 114 may be pre-sliced (e.g., by the content provider system 104). The server system database 422 stores the slices (or, "segments") 906 having at least one insertion point, and generates a mapping 422*c* stored in the server system database 422. For example, the mapping 422*c* may comprise an M3U8 format. The mapping 422*c* may include locations for each segment of the unmarked content item 114. The consumer system 108 requests the unmarked content item 114 (or, "video") from the server system 106 via the consumer interface engine 404, e.g., using the HTTPS protocol. The playlist creator 908 generates a playlist including segments with insertion points and segments without insertion points, based on the content mappings 422*c* stored in the server system datastore 422. The ad provider interface engine 412 collects advertisements 112 using a VAST protocol from an ad server 102. The playlist may be provided to the consumer system 108 through the consumer interface engine 404, and the consumer system 108 may execute the playlist, or portions of the playlist, to stream segments 906 with advertisements from the server system 106, and segments 114 without any advertisements from the content provider database 104*a*. The content processing engine 418 may stitch the advertisements during streaming of one or more segments to the consumer system 108.

Figure 10:
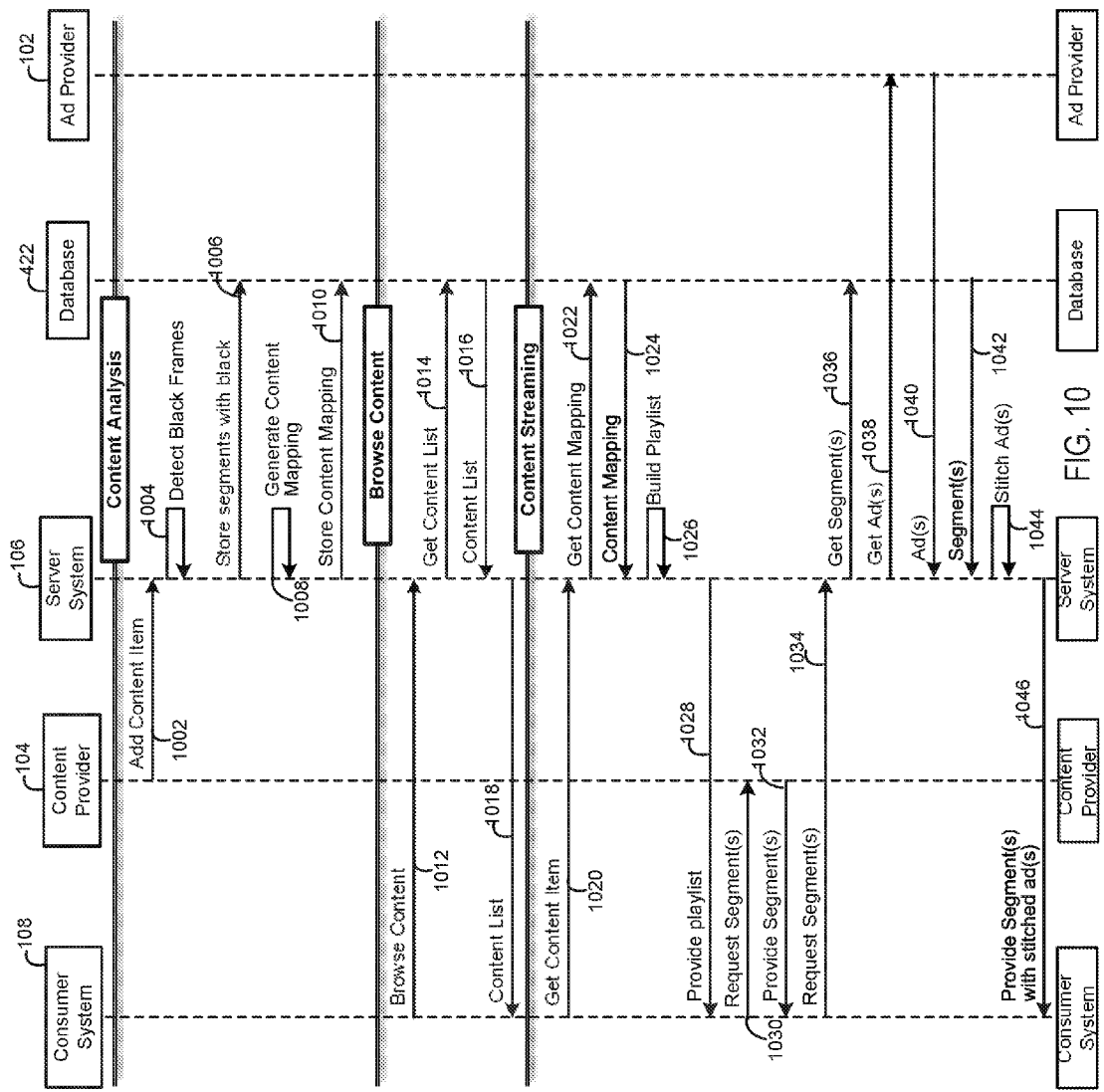
FIG. 10 depicts a flowchart illustrating a method of stitching one or more advertisements in streaming content according to some embodiments.

FIG. 10 depicts a flowchart 1000 illustrating a method of stitching one or more advertisements in streaming content according to some embodiments.

In step 1002, a content provider system 104 provides an unmarked content item to a server system 106. In some embodiments, a content provider interface engine 404 of the server system 106 receives the unmarked content item, and a content manager engine 410 stores the unmarked content item at least temporarily (e.g., cached) in a server system datastore 422.

In step 1004, the server system 106 detects at least one insertion point in the unmarked content item. In some embodiments, an insertion point detector engine 304 detects the insertion points based on one or more sets of sequential black frames.

In step 1006, the server system 106 stores the segments with insertion points in a database 422. In step 108, the server system 106 generates a content mapping indicating a location for each segment. For example, the content mapping may comprises a set of URLs pointing to the server system 106 for segments with an insertion point, and pointing to the content provider system 104 for segments without any insertion points. In some embodiments, a program guide engine 416 generates the content mapping.

In step 1010, the server system 106 stores the content mapping in the server system datastore 422. In some embodiments, a controller engine 402 stores the content mapping in the server system datastore 422.

In step 1012, a consumer system 108 provides a request to the server system 106 to browse unmarked content items, e.g., a list, or other structure, of unmarked content items. In some embodiments, the consumer interface engine 404 of the server system 106 receives the request from the consumer system 108.

In step 1014, the server system 106 provides a request to the database 422 for a list of unmarked content items. In step 1016, the database 422 provides the list to the server system 106. In step 1018, the server system 106 provides the list to the consumer system 108. In some embodiments, a content manager engine 410 provides the request for the list and receives the request for the list, and the consumer interface engine 404 provides the list to the consumer system 108.

In step 1020, the consumer system 108 provides a request to the server system 106 to stream an unmarked content item. In some embodiments, the consumer interface engine 404 receives the request.

In step 1022, the server system 106 provides a request to the database 422 for a content mapping corresponding to the unmarked content item. In some embodiments, the content manager engine 410 provides the request.

In step 1024 the database 422 provides the content mapping to the server system 108. In step 1026, the server system 106 generates a playlist based on the content mapping and ads. In some embodiments, the program guide engine 416 generates the playlist. In other embodiments, a playlist creator engine 908 generates the playlist.

In step 1028, the server system 106 provides the playlist to the consumer system 108. In some embodiments, the consumer interface engine 404 provides the playlist.

In step 1030, the consumer system 108 provides a request to the content provider system 104 for one or more segments without any insertion points. The request may be based on the playlist. For example, the request may comprise a URL pointing to a location of the content provider system 104. In step 1032, the content provider system 104 provides the requested segments to the consumer system 108, and the consumer system 108 renders the segments.

In step 1034, the consumer system 108 provides a request to the server system 106 for one or more segments each having at least one insertion point. The request may be based on the playlist. For example, the request may comprise a URL pointing to a location of the server system 106. In step 1036, the server system 106 provides the request to the database 422.

In step 1038, the server system 106 provides a request for one or more ads to the ad server 102. In some embodiments, an ad provider interface engine 412 provides the request. In step 1040, the ad server 102 provides the ads to the server 106. In some embodiments, the ad provider interface engine 412 receives the ads.

In some embodiments, the server system 106 requests ads prior to requesting segments (e.g., in step 1034). For example, the server system 106 may cache ads received from the ad provider system 102 prior to content streaming.

In step 1042, the database 422 provides segments with insertion points to the server system 106. In step 1044, the server system 106 stitches the ads in the unmarked content item. In some embodiments, the content processing engine 418 stitches the ads.

In step 1046, the server system 106 provides the requested segments with the stitched ads to the consumer system 108, and the consumer system 108 renders the segments. Steps 1030-1046 may be repeated, in various orders, until streaming of the unmarked content item is terminated (e.g., upon reaching an end of the unmarked content item, in response to consumer input, and so forth).

Figure 11:
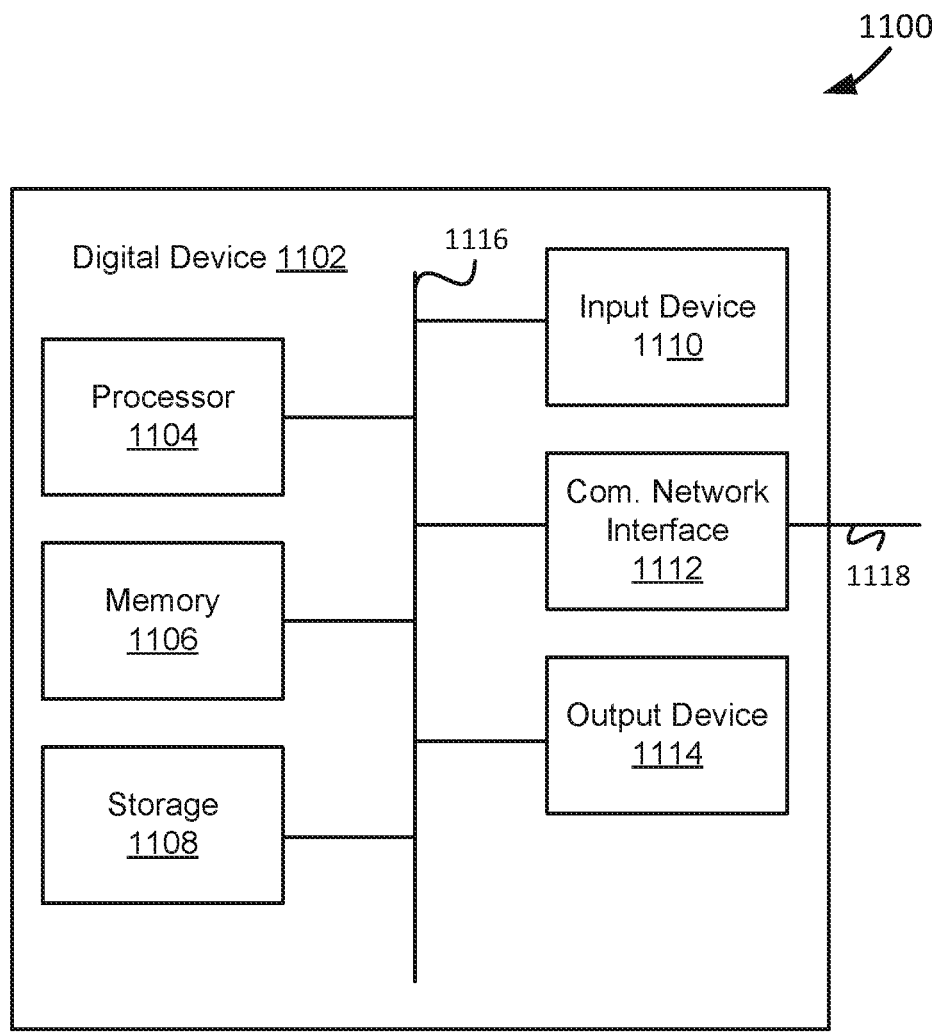
FIG. 11 depicts a block diagram illustrating details of a computing device according to some embodiments.

FIG. 11 depicts a block diagram 1100 illustrating details of a computing device 1102 according to some embodiments. Any of the ad provider system 102, the content provider system 104, the server system 106, the consumer system 108, and the communication network 110 may comprise an instance of the digital device 1102. The digital device 1102 comprises a processor 1104, memory 1106, storage 1108, an input device 1110, a communication network interface 1112, and an output device 1114 communicatively coupled to a communication channel 1116. The processor 1104 is configured to execute executable instructions (e.g., programs). In some embodiments, the processor 1104 comprises circuitry or any processor capable of processing the executable instructions.

The memory 1106 stores data. Some examples of memory 1106 include storage devices, such as RAM, ROM, RAM cache, virtual memory, etc. In various embodiments, working data is stored within the memory 1106. The data within the memory 1106 may be cleared or ultimately transferred to the storage 1108.

The storage 1108 includes any storage configured to retrieve and store data. Some examples of the storage 1108 include flash drives, hard drives, optical drives, and/or magnetic tape. Each of the memory system 1106 and the storage system 1108 comprises a computer-readable medium, which stores instructions or programs executable by processor 1104.

The input device 1110 is any device that inputs data (e.g., mouse and keyboard). The output device 1114 outputs data (e.g., a speaker or display). It will be appreciated that the storage 1108, input device 1110, and output device 1114 may be optional. For example, the routers/switchers may comprise the processor 1104 and memory 1106 as well as a device to receive and output data (e.g., the communication network interface 1112 and/or the output device 1114).

The communication network interface 1112 may be coupled to a network (e.g., network 110) via the link 1118. The communication network interface 1112 may support communication over an Ethernet connection, a serial connection, a parallel connection, and/or an ATA connection. The communication network interface 1112 may also support wireless communication (e.g., 1102.11 a/b/g/n, WiMax, LTE, WiFi). It will be apparent that the communication network interface 1112 may support many wired and wireless standards.

It will be appreciated that the hardware elements of the digital device 1102 are not limited to those depicted in FIG. 11. A digital device 1102 may comprise more or less hardware, software and/or firmware components than those depicted (e.g., drivers, operating systems, touch screens, biometric analyzers, or the like). Further, hardware elements may share functionality and still be within various embodiments described herein. In one example, encoding and/or decoding may be performed by the processor 1104 and/or a co-processor located on a GPU (i.e., NVidia).

It will be appreciated that a "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system, comprising:
one or more processors; and
memory storing instructions that, when executed by the one or more processors, cause the system to perform:
receiving one or more advertisements;
receiving an unmarked content item from a remote content provider system, the unmarked content item comprising a plurality of stream-enabled video segments, at least one stream-enabled video segment of the plurality of stream-enabled video segments including a set of sequential black frames;
identifying one or more insertion points for the at least one stream-enabled video segment of the plurality of stream-enabled video segments, the identification based on one or more locations of at least one black frame of the set of sequential black frames without requiring user input;
discarding the one or more stream-enabled video segments that do not include at least one set of sequential black frames;
stitching the one or more advertisements into the at least one stream-enabled video segment of the plurality of stream-enabled video segments at the one or more insertion points, the stitching including modifying the at least one stream-enabled video segment of the plurality of stream-enabled video segments to add the one or more advertisements into the at least one stream-enabled video segment of the plurality of stream-enabled video segments at the one or more insertion points, thereby enabling identification of the modified at least one stream-enabled video segment of the unmarked content item using a first identifier;
generating a playlist, the playlist comprising the first identifier and a second identifier, the first identifier identifying a first streaming source location of the modified at least one stream-enabled video segment, and the second identifier identifying a second streaming source location of the remote content provider system, the first streaming source location being remote from the second streaming source location;
providing the playlist to a consumer system, the playlist for causing the consumer system to:
first stream the modified at least one stream-enabled video segment, the first stream received from the first streaming source location; and
second stream the at least some of the plurality of stream-enabled video segments that do not include at least one set of sequential black frames, the second stream received from the second streaming source location;
receiving a request from the consumer system to stream the modified at least one stream-enabled video segment; and
streaming the modified at least one stream-enabled video segment to the consumer system in response to the request.

2. The system of claim 1, wherein the one or more advertisements comprise stream-enabled video.

3. The system of claim 1, wherein the consumer system is configured to receive the at least one stream-enabled video segment of the plurality of stream-enabled video segments from the system, and configured to receive the at least some of the plurality of stream-enabled video segments that do not include at least one set of sequential black frames from the remote content provider system.

4. The system of claim 1, wherein, if a corresponding insertion point of the one or more insertion points is located at a start portion of the at least one stream-enabled video segment of the plurality of stream-enabled video segments, the instructions further cause the system to perform streaming the one or more advertisements to the consumer system before the at least one stream-enabled video segment of the plurality of stream-enabled video segments.

5. The system of claim 1, wherein, if a corresponding insertion point of the one or more insertion points is located between a start portion and an end portion of the at least one stream-enabled video segment of the plurality of stream-enabled video segments, the instructions further cause the system to perform (i) pausing the streaming of the at least one stream-enabled video segment of the plurality of stream-enabled video segments to the consumer system when the corresponding insertion point of the one or more insertion points is reached, (ii) streaming the one or more advertisements to the consumer system, and (iii) resuming the streaming of the at least one stream-enabled video segment of the plurality of stream-enabled video segments to the consumer system after the streaming of the one or more advertisements to the consumer system has completed.

6. The system of claim 1, wherein the instructions further cause the system to perform:
generating a playlist, the playlist comprising a first streaming source location associated with the remote content provider system, and a second streaming source location associated with the modified at least one stream-enabled video segment; and
providing the playlist to the consumer system, the playlist allowing the consumer system to:
first stream the at least some of the plurality of stream-enabled video segments that do not include at least one set of sequential black frames, the first stream received from the first streaming source location; and
second stream the modified at least one stream-enabled video segment, the second stream received from the second streaming source location.

7. A method, comprising:
receiving, at a server system, one or more advertisements;
receiving, at the server system, an unmarked content item from a remote content provider system, the unmarked content item comprising a plurality of stream-enabled video segments, at least one stream-enabled video segment of the plurality of stream-enabled video segments including a set of sequential black frames;
identifying, at the server system, one or more insertion points for the at least one stream-enabled video segment of the plurality of stream-enabled video segments, the identification based on one or more locations of at least one black frame of the set of sequential black frames without requiring user input;
discarding, at the server system, at least some of the plurality of stream-enabled video segments that do not include at least one set of sequential black frames;
stitching, at the server system, the one or more advertisements into the at least one stream-enabled video segment of the plurality of stream-enabled video segments at the one or more insertion points, the stitching including modifying the at least one stream-enabled video segment of the plurality of stream-enabled video segments to add the one or more advertisements into the at least one stream-enabled video segment of the plurality of stream-enabled video segments at the one or more insertion points, thereby enabling identification of the modified at least one stream-enabled video segment of the unmarked content item using a first identifier;

generating a playlist, the playlist comprising the first identifier and a second identifier, the first identifier identifying a first streaming source location of the modified at least one stream-enabled video segment, and the second identifier identifying a second streaming source location of the remote content provider system, the first streaming source location being remote from the second streaming source location;

providing the playlist to a consumer system, the playlist for causing the consumer system to:
first stream the modified at least one stream-enabled video segment, the first stream received from the first streaming source location; and
second stream the at least some of the plurality of stream-enabled video segments that do not include at least one set of sequential black frames, the second stream received from the second streaming source location;

receiving, at the server system, a request from the consumer system to stream the modified at least one stream-enabled video segment; and streaming, from the server system, the modified at least one stream-enabled video segment to the consumer system in response to the request.

8. The method of claim 7, wherein the one or more advertisements comprise stream-enabled video.

9. The method of claim 7, further comprising receiving, at the consumer system, the at least some of the plurality of stream-enabled video segments that do not include at least one set of sequential black frames from the remote content provider system.

10. The method of claim 7, further comprising, if a corresponding insertion point of the one or more insertion points is located at a start portion of the at least one stream-enabled video segment of the plurality of stream-enabled video segments, streaming the one or more advertisements to the consumer system before the at least one stream-enabled video segment of the plurality of stream-enabled video segments.

11. The method of claim 7, further comprising, if a corresponding insertion point of the one or more insertion points is located between a start portion and an end portion of the at least one stream-enabled video segment of the plurality of stream-enabled video segments, (i) pausing the streaming of the at least one stream-enabled video segment of the plurality of stream-enabled video segments to the consumer system when the corresponding insertion point of the one or more insertion points is reached, (ii) streaming the one or more advertisements to the consumer system, and (iii) resuming the streaming of the at least one stream-enabled video segment of the plurality of stream-enabled video segments to the consumer system after the streaming of the one or more advertisements to the consumer system has completed.

12. The method of claim 7, further comprising:
generating a playlist, the playlist comprising a first streaming source location associated with the remote content provider system, and a second streaming source location associated with the modified at least one stream-enabled video segment; and
providing the playlist to the consumer system, the playlist allowing the consumer system to:
first stream the at least some of the plurality of stream-enabled video segments that do not include at least one set of sequential black frames, the first stream received from the first streaming source location; and
second stream the modified at least one stream-enabled video segment, the second stream received from the second streaming source location.

13. A non-transitory computer readable medium comprising executable instructions, the instructions being executable by a processor to perform a method, the method comprising:
receiving one or more advertisements;
receiving an unmarked content item from a remote content provider system, the unmarked content item comprising a plurality of stream-enabled video segments, at least one stream-enabled video segment of the plurality of stream-enabled video segments including a set of sequential black frames;
identifying one or more insertion points for the at least one stream-enabled video segment of the plurality of stream-enabled video segments, the identification based on one or more locations of at least one black frame of the set of sequential black frames without requiring user input;
discarding the one or more stream-enabled video segments that do not include at least one set of sequential black frames;
stitching the one or more advertisements into the at least one stream-enabled video segment of the plurality of stream-enabled video segments at the one or more insertion points, the stitching including modifying the at least one stream-enabled video segment of the plurality of stream-enabled video segments to add the one or more advertisements into the at least one stream-enabled video segment of the plurality of stream-enabled video segments at the one or more insertion points, thereby enabling identification of the modified at least one stream-enabled video segment of the unmarked content item using a first identifier;
generating a playlist, the playlist comprising the first identifier and a second identifier, the first identifier identifying a first streaming source location of the modified at least one stream-enabled video segment, and the second identifier identifying a second streaming source location of the remote content provider system, the first streaming source location being remote from the second streaming source location;
providing the playlist to a consumer system, the playlist for causing the consumer system to:
first stream the modified at least one stream-enabled video segment, the first stream received from the first streaming source location; and
second stream the at least some of the plurality of stream-enabled video segments that do not include at least one set of sequential black frames, the second stream received from the second streaming source location;
receiving a request from the consumer system to stream the modified at least one stream-enabled video segment; and streaming the modified at least one stream-enabled video segment to the consumer system in response to the request.

\* \* \* \* \*